2,777,869
POLYMERIZATION OF VINYLALKOXYSILANES

Donald L. Bailey, Snyder, and Robert Y. Mixer, Kenmore, N. Y., assignors to Union Carbide and Carbon Corporation, a corporation of New York No Drawing. Application August 13, 1953,
Serial No. 374,137

13 Claims. (Cl. 260—448.2)

This invention relates to the polymerization of unsaturated silanes having a vinyl group and at least one alkoxy group attached to the silicon atom.

Such unsaturated silanes may be represented by the formula:

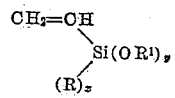

where R is a monovalent hydrocarbon radical, $R^1$ is an alkyl radical including alkoxyalkyl, $x$ is 0, 1 or 2, and $y$ is 1, 2 or 3, $x+y$ being 3. The polymerization of such silanes by the process of this invention is through the vinyl group and results in homopolymers of the structure:

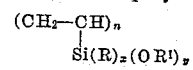

where $n$ is an integer. The alkoxy group attached to the pendant alkoxysilane groups are quite reactive, and may be reacted with polyhydric alcohols to form cross-linked polymers. Cross-linking can also be obtained by hydrolytic condensation to form polymers of the structure:

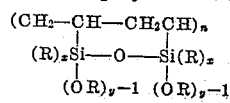

Similarly, cross-linking between different homopolymer molecules can occur.

The homopolymers of this invention differ from other vinyl siloxane polymers in that polymerization occurs through the vinyl group, rather than through the silicon atom. As a result the homopolymers contain a long hydrocarbon chain, which makes for greater compatibility with organic solvents and resins. Thus the homopolymers are useful as plasticizers and modifiers for synthetic resins. For example, they may be used as insolubilizing and toughening agents for polyvinyl alcohol. They also may be used as adhesives and sizing agents.

The polymerization of vinylalkoxysilanes has heretofore been suggested but the methods employed resulted only in residue polymers, typically brittle resins brown to black in color. On the other hand, the method of this invention results in true homopolymers which are colorless to light-colored products ranging from viscous liquids to gummy or plastic solids. It has been found that the polymerization of vinylalkoxysilanes requires the use of highly pure monomers and that only one catalyst, di-t-butyl peroxide, is markedly effective for making viscous polymers.

Comparative experiments were carried out to show the effectiveness of di-t-butyl peroxide as a catalyst, compared to other polymerization catalysts. The experiments were carried out by heating highly purified vinyltriethoxysilane at 125° C. for 16 hours, in the presence of various peroxides.

The polymer was evaluated on the basis of the length of time required for the unstripped material to partially flow out of a glass tube. Two marks on the tube were used to measure the flow of a given amount of material. Three different size tubes signified as A, B and C were used in order that material of widely different viscosities could be evaluated. A description of these tubes follows:

DESCRIPTION OF EFFLUX TUBES

| Tube | A | B | C |
|---|---|---|---|
| Type | 10 ml. Kimble "Normax" Vol. Pipette. | 10 ml. Kimble "Normax" Vol. Pipette. | 5 ml. Kimble "Normax" Measuring Pipette. |
| Modification | None | Tip completely removed. | Tip partially removed. |
| Length between flow points, cm | 14.40 | 16.65 | 17.05. |
| Factor reducing to Tube A | 1.0 | 13.4 | 122. |
| Calibration:[1] Flow time, sec. @ room temp | 182 | 161 | 902. |
| Viscosity, cs. @ 25° C | 98.2 | 1,012 | 55,000. |

[1] Calibration done with silicone fluids of known viscosity.

The polymerization results using different catalysts are given in Table I.

Table I.—Effectiveness of various peroxides as catalysts for the homopolymerization of vinyltriethoxysilane

| Expt. No. | Catalyst | Product Efflux Time[1] in Sec., Catalyst Concentration | |
|---|---|---|---|
| | | 0.10 wt. Percent | 1.0 wt. Percent |
| a | di-t-butyl peroxide | [2] 36,000 | [2,3] 66,000 |
| b | 2,2-bis(t-butylperoxy)butane | [2] 8,650 | |
| c | di-t-butyl diperphthalate | [4] 2,170 | |
| d | t-butylperacetate | 77.5 | |
| e | t-butyl perbenzoate | 33.8 | 154.3 |
| f | p-t-butylcumene hydroperoxide | 23.0 | 82.7 |
| g | cumene hydroperoxide | 28.2 | 39.7 |
| h | p-menthane hydroperoxide | 21.5 | 23.9 |
| i | benzoyl peroxide | | 18.9 |
| j | cyclohexanone peroxide | 23.2 | 17.8 |
| k | p-chlorobenzoyl peroxide | | 16.9 |
| l | acetyl peroxide | 22.2 | |
| m | no catalyst—unheated seconds | 16.3 | |
| n | no catalyst—heated do | 19.4 | |

Notes for Table I:
[1] Efflux time measured in tube A, on unstripped products.
[2] Efflux time measured in tube C, then extrapolated to tube A.
[3] Catalyst concentration 0.5 wt. percent for this experiment.
[4] Efflux time measured in tube B, then extrapolated to tube A.

The data in Table I clearly shows that highly viscous polymers are formed only in the presence of di-t-butyl peroxide. The catalysts in tests b to f, containing a t-butyl group were only moderately effective, the rest were ineffective.

The catalyst concentration and polymerization temperatures have an effect on polymer properties. In general, the polymer viscosity increased with increasing catalyst concentration until an optimum concentration is reached. At low catalyst concentrations, the polymer viscosity increases with increasing polymerization temperature, but at higher catalyst concentrations, the polymer viscosity appears to decrease with increasing polymerization temperature. These effects are shown in the following Table II.

Table II.—*Effect of temperature and catalyst concentration on the homopolymerization of vinyltriethoxysilane*

| Expt. No. | Di-t-butyl peroxide conc., wt. percent | Bulk Viscosity of Product (centistokes at 100° F.) | | |
|---|---|---|---|---|
| | | 125° C.[1] 16 hr.[2] | 125° C.[1] 64 hr.[2] | 150° C.[1] 16 hr.[2] |
| a | None | 8.8 | 35.5 | 8.9 |
| b | 0.02 | 15 | 110 | 1,260 |
| c | 0.10 | [3]>23,000 | 23,100 | 3,510 |
| d | 0.20 | 8,720 | | |
| e | 1.0 | 3,420 | | |

[1] Reaction temp.
[2] Reaction time.
[3] This product was stripped of 3 wt. percent lights after which it was too viscous for the test.

In addition to the specific catalyst used, and the need for pure monomers, the polymerization of the vinylalkoxysilanes is preferably conducted in an inert, substantially anhydrous atmosphere. The presence of oxygen, air or substantial amounts of moisture is undesirable, as polymer viscosity is reduced. However, some degree of polymerization can be achieved even under these adverse conditions. Preferably, however, an inert atmosphere, such as nitrogen, argon, carbon dioxide, or other inert gas is maintained over the monomer during polymerization. The effect of the atmosphere on the polymerization was shown in the experiments to follow, in which vinyltriethoxysilane was heated for 16 hours at 125° C. under different atmospheres.

Table III.—*Influence of atmosphere on the homopolymerization of vinyltriethoxysilane*

[These experiments heated at 125° C. for 16 hours.]

| Expt. No. | Di-t-butyl peroxide content, Atmosphere | Product Efflux [1] Time in Seconds | | |
|---|---|---|---|---|
| | | None | 0.02 wt. Percent | 0.1 wt. Percent |
| a | Dry argon | <2 | 29.6 | 3,880 |
| b | Air | <2 | 4.2 | 220 |
| c | Oxygen | <2 | <2 | 6.9 |
| d | Argon saturated with water | <2 | 19 | <2 |

[1] Efflux time measured in tube B.

The following examples will further illustrate the practice of the invention:

EXAMPLE 1

Di-t-butyl peroxide (0.50 gram) was diluted to 25.0 ml. with purified vinyltriethoxysilane in a Normax volumetric flask to form a catalyst solution. Then 21.5 ml. of purified vinyltriethoxysilane (B. P. 70° C. @ 30 mm. Hg $n_D^{25}$ 1.3966, $d_4^{25}$ 0.9036; $MR_D$; calculated 50.61; observed, 50.66; infrared spectrum No. 619, efflux time unheated 16.4 seconds in tube A) and 1.00 ml. of the catalyst solution were placed in a rigorously cleaned, 25 mm. x 200 mm. Pyrex test tube flushed with argon and equipped with a well-fitting cork. Thus the contents of the tube were 22.5 ml. (20.0 grams) of vinyltriethoxysilane and 0.02 gram (or 0.10 wt. percent) of di-t-butyl peroxide. The contents were shaken and then the space above the contents again flushed with argon. The contents and test tube were heated in a constant temperature oil bath at 125° C. for 16 hours. The polymerized material was stripped of monomer by heating at 125° C. and 1 mm. Hg absolute pressure until no more monomer was removed (about 1 hour). Approximately 0.5 gram of monomer was removed indicating a 97 percent conversion. The resulting product was a clear, colorless, very viscous liquid having the following physical properties:

$n_D^{25}$ = 1.4445
$d_4^{25}$ = 0.97 to 1.00
Infrared spectrum = No. 621
Efflux time in tube C = 570 seconds
Efflux time extrapolated to tube A = 65,000 seconds The product was examined by infrared absorption and the several absorption bands accepted as signifying the presence of the vinyl (C=C) double bond were shown to be missing. This proves that the vinyl group has reacted.

INFRARED ANALYSIS

| Bands | | Probable Assignment |
|---|---|---|
| Monomer | Polymer | |
| 3.27μ | Missing | C-H stretch in vinyl group. |
| 6.22μ | Missing | C=C stretch in vinyl group. |
| 7.09μ | Reduced | CH₂ deformation in vinyl group (sym. in-plane). |
| 7.83μ | Missing | CH deformation in vinyl group (in-plane). |
| 9.88μ | Missing | CH deformation in vinyl group (out-of-plane). |
| 10.38μ | | CH deformation in vinyl group (out-of-plane) plus Si-O-C vibration. |
| | 10.45μ | Si-O-C vibration (less intense than combined band at 10.38μ in monomer). |

EXAMPLE 2

The homopolymerization of the vinylalkoxysilanes also occurs when a monovalent hydrocarbon radical, such as an aryl or alkyl radical, replaces one or two of the alkoxy groups. Thus vinylethyldiethoxysilane, vinylphenyldiethoxysilane and vinyldiphenylethoxysilane were polymerized under conditions tabulated below by heating for 16 hours at 125° C.

Table IV.—*Homopolymerization of other vinylethoxysilanes*

| Expt. No. | Di-t-butyl peroxide conc., Monomer | Product Efflux [1] Time in Seconds | | | |
|---|---|---|---|---|---|
| | | None | 0.02 wt. Percent | 0.10 wt. Percent | 0.5 wt. Percent |
| a | Vinyltriethoxysilane | 19.4 | 136 | [2] 36,000 | [2] 66,000 |
| b | Vinylethyldiethoxysilane | 17.2 | 18.8 | 25 | [2] 6,000 |
| c | Vinylphenyldiethoxysilane | 19.3 | 23.2 | 33.1 | [2] 134,000 |
| d | Vinyldiphenylethoxysilane | 23.2 | 27.7 | 36.0 | [2] 8,870 |

[1] Efflux time measured in tube A.
[2] Extrapolated values from times measured in tube C.

The physical properties of the vinyldiphenylethoxysilane monomer were: B. P. 148° C. at 5.0 mm. Hg; $n_D^{25}$ 1.5504; $d_4^{25}$ 1.0169; $MR_D$ observed, 79.73, calculated 79.47. When samples of vinyldiphenylethoxysilane containing 1 percent di-t-butyl peroxide were heated for 16 hours at 125° C., the product was a plastic solid; when heated for 16 hours at 150° C., the product was a brittle solid; and when heated for 144 hours at 100° C., the product was a viscous liquid having an efflux time in tube A of 18,200 seconds.

EXAMPLE 3

Vinyl alkoxysilanes containing substituents on the alkyl group may also be polymerized. Thus vinyltris-(2-methoxyethoxy)silane was polymerized under the conditions tabulated below:

Table V.—*Catalyzed homopolymerization of vinyltris-(2-methoxyethoxy)silane*

| Expt. No. | Polymerization Conditions | Di-t-butyl Peroxide, Wt. Percent | Efflux time [a] of Polymer (sec. in Tube A) |
|---|---|---|---|
| a | 16 hr. at 125° C. | 0.00 | [b] 22.4 |
| b | do | 0.02 | 44.5 |
| c | do | 0.10 | 180 |
| d | do | 0.50 | 540 |
| e | do | 1.00 | 550 |
| f | 5 hr. at 150° C. | 0.10 | 181 |
| g | do | 1.00 | 226 |

[a] On bulk polymer.
[b] Unheated monomer 18.9 seconds.

From the foregoing examples, it will be seen that the more viscous liquid homopolymers of vinylalkoxysilanes range upwards from a viscosity of 2,170 seconds in tube A for vinyltriethoxysilane (Table I, expt. No. c), which, applying the calibration factors for the efflux tubes, is equivalent to about 1000 cs. at 25° C. (The tube A value being factored back to tube B, the experimental tube, and applying the calibration factor for tube B.) The most viscous liquid polymer was obtained from vinylphenyldiethoxysilane (Table IV, expt. No. c) having an extrapolated viscosity of 134,000 seconds in tube A, which, factored back to tube C, the experimental tube, and applying the calibration factor for tube C is equivalent to a viscosity of about 67,000 cs. at 25° C. Similarly, the most viscous polymer from vinyltriethoxysilane (Table IV, expt. No. a) had an extrapolated viscosity of 66,000 seconds in tube A, which is equivalent to a viscosity of about 33,000 cs. at 25° C. The most viscous polymer from vinylethyldiethoxysilane was 6000 seconds (Table IV, expt. No. b), equivalent to 3000 cs. at 25° C., and from vinyldiphenylethoxysilane was 18,200 seconds (Example 2, equivalent to about 9,000 cs. at 25° C.).

What is claimed is:

1. Process for making homopolymers of vinylalkoxysilanes which comprises heating a silane of the structure—

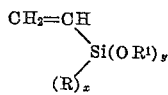

where R is a monovalent hydrocarbon radical, $R^1$ is an alkyl radical, $x$ is an integer from 0 to 2, $y$ is an integer from 1 to 3, and $x+y=3$, in the presence of an organic peroxide containing a tertiary butoxy group.

2. Process for making homopolymers of vinylalkoxysilanes which comprises heating a silane of the structure—

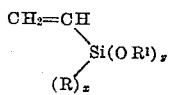

where R is a monovalent hydrocarbon radical, $R^1$ is an alkyl radical, $x$ is an integer from 0 to 2, $y$ is an integer from 1 to 3, and $x+y=3$, in the presence of di-t-butyl peroxide.

3. Process for making homopolymers of vinyltriethoxysilane which comprises heating vinyltriethoxysilane in the presence of di-t-butyl peroxide.

4. Process for making homopolymers of vinylethyldiethoxysilane which comprises heating vinylethyldiethoxysilane in the presence of di-t-butyl peroxide.

5. Process for making homopolymers of vinylphenyldiethoxysilane which comprises heating vinylphenyldiethoxysilane in the presence of di-t-butyl peroxide.

6. Process for making homopolymers of vinyldiphenylethoxysilane which comprises heating vinyldiphenylethoxysilane in the presence of di-t-butyl peroxide.

7. Process for making homopolymers of vinyltris-(2-methoxyethoxysilane) which comprises heating vinyltris-(2-methoxyethoxy)silane in the presence of di-t-butyl peroxide.

8. Process as claimed in claim 1 in which the amount of the catalyst is from 0.02 percent to 1 percent by weight of the vinylalkoxysilane.

9. Homopolymers of monovinylalkoxysilanes polymerized through the vinyl group, said homopolymers being colorless to light-colored viscous liquids having a viscosity of about 1000 cs. to about 67,000 cs. at 25° C., and said monovinylalkoxysilanes having the structure—

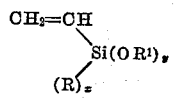

where R is a monovalent hydrocarbon radical, $R^1$ is an alkyl radical, $x$ is an integer from 0 to 2, $y$ is an integer from 1 to 3, and $x+y=3$.

10. Homopolymers of vinyltriethoxysilane polymerized through the vinyl group, said homopolymers being colorless to light-colored viscous liquids having a viscosity of about 1000 cs. to about 33,000 cs. at 25° C.

11. Homopolymers of vinylethyldiethoxysilane polymerized through the vinyl group, said homopolymers being colorless to light-colored viscous liquids having a viscosity of about 1000 cs. to about 3,000 cs. at 25° C.

12. Homopolymers of vinylphenyldiethoxysilane polymerized through the vinyl group, said homopolymers being colorless to light-colored viscous liquids having a viscosity of about 1000 cs. to about 67,000 cs. at 25° C.

13. Homopolymers of vinyldiphenylethoxysilane polymerized through the vinyl group, said homopolymers being colorless to light-colored viscous liquids having a viscosity of about 1000 cs. to about 9000 cs. at 25° C.

References Cited in the file of this patent

UNITED STATES PATENTS 2,532,583  Tyran _____ Dec. 5, 1950

FOREIGN PATENTS 684,597  Great Britain _____ Dec. 24, 1952

OTHER REFERENCES

Wagner et al.: "Ind. and Eng. Chem.," vol. 45, 3 pages 367–373 (1953).